United States Patent Office 2,993,929
Patented July 25, 1961

2,993,929
PROCESS FOR PREPARING PHOSPHONOTHIOIC CHLORIDES AND PHOSPHINOTHIOIC CHLORIDES AND NEW PRODUCTS PRODUCED BY SAID PROCESS
Kenneth H. Rattenbury, South Chicago Heights, Ill., assignor to Victor Chemical Works, a corporation of Illinois
No Drawing. Filed May 14, 1957, Ser. No. 658,972
12 Claims. (Cl. 260—543)

This invention relates to a new process for the production of phosphonothioic dichlorides and phosphinothioic chlorides, and to new compounds produced by this process.

In particular, this invention relates to a process whereby compounds of the formula

wherein R is alkyl, aryl, haloalkyl, haloaryl and A is the same or different R, or a chlorine substituent, are prepared by reacting the corresponding oxygen analog with phosphorus sulfides. There is thus provided a simple process whereby phosphonic dichlorides and phosphinic chlorides are converted into the corresponding phosphonothioic dichlorides and phosphinothioic chlorides.

The products produced by this new process are valuable chemical intermediates and may be used in the manufacture of many useful compounds. For example, the products produced by our invention may be used to form compounds having active insecticidal properties. Thus, phenylphosphonothioic dichloride may be used to manufacture EPN (O-ethyl, O-paranitrophenyl thionophenylphosphonate), a well known insecticide, according to the process shown in U.S. Patent No. 2,503,390. Likewise, chloromethylphosphonothioic dichloride may be used to make O-ethyl, O-paranitrophenyl thionochloromethylphosphonate by a similar process. This latter compound has been found to be a good insecticide against a wide variety of insects when used at concentrations of from 0.005% to 0.02%.

My process is the only way that is presesntly known to make chloromethylphosphonothioic chlorides, which represent a class of new and useful chemical compounds. These new compounds may be represented by the general formula

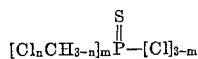

wherein $n$ may be from 1 to 3 and $m$ is 1 or 2. Representative compounds are mono, di or trichloromethylphosphonothioic dichloride and bis(mono, di or trichloromethyl) phosphinothioic chloride.

Generally, my invention contemplates a process which comprises simply mixing the phosphonic dichloride or phosphinic chloride with phosphorus sulfide reactants having an oxygen-replaceable sulfur substituent linked to a phosphorus substituent by means of a double bond in accordance with the following illustrative reactions:

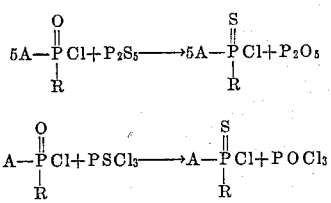

wherein R is a member of the class consisting of alkyl, aryl, haloalkyl and haloaryl, and A is the same or a different R or a chlorine substituent. The reactants are then simply heated until the reaction is complete. Normally the reaction is conducted at reflux temperature when a phosphorus sulfide such as $P_2S_5$ is used; this temperature will vary depending upon the particular reactants used but is generally in the range of 150° to 250° C. When $PSCl_3$ is used, it is necessary to conduct the reaction under pressure due to the low boiling point of $PSCl_3$. It is important that the temperature for this latter reaction be in the range of 180° to 230° C. The pressure is not important per se but is used to facilitate the reaction so that temperatures above the boiling point of the reacants may be used. Generally, pressures of 250–400 p.s.i. are satisfactory.

The time required for the reaction is not critical but should be of sufficient duration to substantially complete the reaction. Since the reaction involves the exchange of oxygen and sulfur, the length of the reaction time is of importance with regard to the completeness of the reaction. Thus, some of the following examples show an initial reaction period, after which the purity is checked, followed by a further reaction period. This double reaction period is not necessary to the process but serves only as a means of checking the progress of the reaction. Likewise, some examples show washing the product with ice water, etc. These techniques are not necessary to the new process but serve to produce a purer product for purposes of identification and analysis.

The phosphorus sulfide reactants include sulfides such as $P_2S_5$, $P_4S_3$, $P_4S_7$, and $PSCl_3$; however, the use of $P_2S_5$ is generally preferred.

The reactants in all cases may be commercial grade products as extreme purity is not necessary to carry out the reaction. In the case of $P_2S_5$ and $PSCl_3$, these products are standard articles of commerce. Phenylphosphonic dichloride and chloromethylphosphonic dichloride may also be obtained commercially.

The following examples illustrate the process of the present invention.

Example I 2508.0 gms. of $ClCH_2POCl_2$ (15.0 moles) and 666.0 gms. of $P_2S_5$ (3.0 moles) were placed in a distilling flask equipped with a reflux condenser. The mixture was then heated at a reflux temperature of 185° to 180° C. for three hours. It was weighed and found to have lost 33.0 gms. The flask was then evacuated to an absolute pressure of 10 mm. of mercury and heated to a liquid temperature of 160° C., at which the vapor temperature was 88° C. The resulting distillate weighed 2049.4 gms. and was redistilled at a pressure of 30 mm. of mercury. The chloromethylphosphonothioic dichloride was collected over a vapor temperature range of 88°–89° C. It weighed 1589.3 gms. and analyzed as follows: $n_{25}{}^D=1.5711$.

|          | Percent P | Percent Cl | Percent S |
|----------|-----------|------------|-----------|
| Analysis | 17.3      | 58.0       | 17.1      |
| Theory   | 16.9      | 58.0       | 17.4      |

One mole of this product was reacted with one mole (plus 3% excess) ethyl alcohol in the presence of triethylamine to form O-ethyl chloromethanephosphonothioic chloride according to well-known procedures. In turn this product was reacted with paranitrophenol to form O-ethyl, O-paranitrophenyl thionochloromethylphosphonate. This compound was tested as an insecticide against the house fly, German roach, confused flour beetle, black carpet beetle, granary weevil, bean aphid, two spotted mite and bean aphid. It was found to be an effective insecticide in all cases at concentrations of 0.005% to 0.5% in acetone spray solution.

Example II 83.8 gms. (0.5 mole) of $ClCH_2POCl_2$ and 169.5 gms. (0.5 mole plus 100% excess) of $PSCl_3$ were placed in a one liter glass liner. The liner was then placed in a small autoclave and placed under 300 p.s.i. nitrogen pressure. It was heated at 220° C.±10° for 5½ hours. It was then cooled, placed in a distilling flask and the excess $PSCl_3$ and $POCl_3$ removed at atmospheric pressure. The remaining product was cooled to 15° C., stirred with 18 cc. of water, separated, and dried. It was then placed in a distilling flask, evacuated to an absolute pressure of 30 mm. of mercury and distilled. The chloromethylphosphonothioic dichloride fraction distilling at a vapor temperature from 90° to 92° C. was collected and analyzed as follows: $n_{25}^D = 1.5742$.

|  | Percent P | Percent Cl | Percent S |
|---|---|---|---|
| Theory | 16.9 | 58.0 | 17.4 |
| Analysis | 16.8 | 58.0 | 16.9 |

Example III

Using the same equipment as in Example II, 44.2 gms. of $C_2H_5POCl_2$ (0.3 mole) and 101.8 gms. of $PSCl_3$ (0.3 mole plus 100% excess) were charged to the autoclave and placed under 300 p.s.i. nitrogen pressure. The charge was heated at 200° to 215° C. for six hours. The charge was cooled and the excess $PSCl_3$ and $POCl_3$ removed by distilling at atmospheric pressure. The remaining product was cooled to 10° C. and washed twice with ice water. The resulting organic layer was dried over calcium chloride and distilled through a Vigreux column at a pressure of 50 mm. of mercury. The fraction distilling at a vapor temperature of 93° C. was collected and analyzed as follows: $n_{25}^D = 1.5399$.

|  | Percent P | Percent Cl | Percent S |
|---|---|---|---|
| Theory | 18.95 | 43.4 | 19.6 |
| Analysis | 18.6 | 44.7 | 19.8 |

This product was ethylphosphonothioic dichloride.

Example IV

Using the same equipment as in Example II, 87.7 gms. (0.45 mole) of $C_6H_5POCl_2$ and 152.5 gms. of $PSCl_3$ (0.45 mole plus 100% excess) were placed under a pressure of 300 p.s.i. and heated at 235° to 255° C. for 5½ hours. After removing the excess $PSCl_3$ and $POCl_3$ at atmospheric pressure, the crude product was washed twice with ice water and then dried over calcium chloride. It was distilled using a Vigreux column. The phenylphosphonothioic dichloride was collected at a vapor temperature of 64° C. at a pressure of 1 mm. of mercury and analyzed as follows: $n_{25}^D = 1.6228$.

|  | Percent P | Percent Cl | Percent S |
|---|---|---|---|
| Theory | 14.7 | 33.7 | 15.2 |
| Analysis | 14.0 | 34.2 | 14.6 |

Example V 31.7 gms. of $ClC_6H_4POCl_2$ (0.138 mole) and 6.1 gms. of $P_2S_5$ (0.0275 mole) were placed in a 100 cc. distilling flask equipped with a condenser and calcium chloride tube. The slurry was heated to 170° C. for three hours and then cooled. It was evacuated to a pressure of <1 mm. of mercury and distilled collecting the fraction distilling at a vapor temperature of 91° to 96° C. 15 gms. of this sample were washed with ice water and then dried over calcium chloride. It was then distilled through a Vigreux column collecting the fraction distilling at a vapor temperature of 101° to 105° C. at 1 mm. of mercury. This para chlorophenylphosphonothioic dichloride analyzed as follows: $n_{25}^D = 1.6323$.

|  | Percent P | Percent Cl | Percent S |
|---|---|---|---|
| Theory | 12.6 | 43.4 | 13.0 |
| Analysis | 12.4 | 43.5 | 12.6 |

Example VI 236.5 gms. of $Cl_3CPOCl_2$ (1.0 mole) and 44.4 gms. of $P_2S_5$ (0.2 mole) were placed in a 500 cc. distilling flask equipped with a reflux condenser and heated to a reflux temperature of 206–210° C. The heating was continued for eight hours, at which time a sample indicated that the reaction was incomplete. Therefore an additional 11.1 gms. of $P_2S_5$ were added and the mixture refluxed for an additional 20 hours. The product was distilled at 195° to 200° C. under slightly reduced pressure. The product, weighing 139.5 gms., was an orange solid, trichloromethylphosphonothioic dichloride, and analyzed as follows:

|  | Percent P | Percent Cl | Percent S |
|---|---|---|---|
| Theory | 12.3 | 70.3 | 12.7 |
| Analysis | 12.4 | 69.9 | 12.2 |

Example VII 118.2 gms. of $(C_6H_5)_2POCl$ (0.5 mole) and 22.2 gms. of $P_2S_5$ (0.1 mole) were placed in a 300 cc. distilling flask equipped with a reflux condenser and heated at 190° to 200° C. for three hours. The product was distilled at 170° to 175° C. at a pressure of 3–4 mm. of mercury and the distillate redistilled collecting the fraction distilling at a vapor temperature of 134° to 139° C. at a pressure of 1 mm. of mercury. Since analysis showed the reaction was not complete, 2.0 gms. of $P_2S_5$ were added and the mixture was heated at 190° to 200° C. for two hours. The product was then distilled at 150° to 155° C. at 2 mm. of mercury to yield 69.6 gms. of diphenylphosphinothioic chloride [$(C_6H_5)_2PSCl$], which had an index of refraction $n_{25}^D = 1.6586$.

As a further check on purity the product was stirred with 100 cc. of distilled water at 30° C. for one hour, dried, and redistilled to give a product with an index of refraction $n_{25}^D = 1.6587$. This product analyzed:

|  | Percent P | Percent Cl | Percent S |
|---|---|---|---|
| Theory | 12.3 | 14.1 | 12.7 |
| Found | 12.2 | 15.3 | 12.7 |

Example VIII 56.6 gms. of

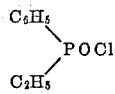

and 13.3 gms. of $P_2S_5$ were placed in a 100 cc. distilling flask and then heated at 160° to 190° C. for two hours. The flask was then evacuated and the product distilled collecting the fraction distilling at a vapor temperature of 107° C. at 1 mm. of mercury. The product was further purified by washing with water and then redistilled. The resulting ethyl phenylphosphinothioic chloride analyzed: $n_{25}^D = 1.6035$.

|  | Percent P | Percent Cl | Percent S |
|---|---|---|---|
| Theory | 15.2 | 17.4 | 15.7 |
| Analysis | 15.7 | 17.6 | 15.3 |

Example IX 45.4 gms. of $(ClCH_2)_2POCl$ (0.25 mole) were heated with 11.1 gms. $P_2S_5$ at 160° to 180° C. for three hours. The charge was then cooled and evacuated to a pressure of 1 mm. of mercury. After removal of volatiles, the product was washed with ice water, dried and distilled at a vapor temperature of 80° to 85° C. at 3 mm. of mercury. The product, bis (chloromethyl) phosphinothioic chloride, weighed 15.4 gms. and analyzed as follows: $n_{25}{}^D = 1.5859$.

|  | Percent P | Percent Cl | Percent S |
|---|---|---|---|
| Theory | 15.7 | 53.9 | 16.2 |
| Analysis | 15.9 | 53.0 | 16.7 |

The phrase "phosphorus sulfide reactant" in the claims is not intended to be restricted to binary compounds but includes compounds such as phosphorus thiohalides (e.g., $PSCl_3$).

The foregoing detailed description has been given for clearness of understanding only, and no unnecessary limitations should be understood therefrom, as modifications will be obvious to those skilled in the art.

I claim:

1. A process for preparing a compound of the formula

wherein R is a member of the class consisting of alkyl, phenyl, chloroalkyl and chlorophenyl, and A is a member of the class consisting of alkyl, phenyl, chloroalkyl, chlorophenyl and chlorine, which comprises reacting at temperatures of about 150–255° C. a compound of the formula

with a phosphorus sulfide reactant from the group consisting of $P_2S_5$, $P_4S_3$, $P_4S_7$, and $PSCl_3$.

2. The process of claim 1 wherein the phosphorus sulfide reactant is $P_2S_5$.

3. The process of claim 1 wherein the phosphorus sulfide reactant is $P_4S_3$.

4. The process of claim 1 wherein the phosphorus sulfide reactant is $P_4S_7$.

5. The process of claim 1 wherein the phosphorus sulfide reactant is $PSCl_3$.

6. A process for preparing a product of the formula

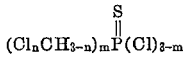

wherein $n$ is a positive integer of 1–3 and $m$ is a positive integer of at least 1 and not more than 2, which comprises: reacting at temperatures of about 150–255° C. a compound of the formula

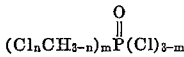

with a phosphorus sulfide reactant selected from the group consisting of $P_2S_5$, $P_4S_3$, $P_4S_7$, and $PSCl_3$.

7. The process of claim 6 wherein the phosphorus sulfide reactant is $P_2S_5$.

8. The process of claim 6 wherein the phosphorus sulfide reactant is $P_4S_3$.

9. The process of claim 6 wherein the phosphorus sulfide reactant is $P_4S_7$.

10. The process of claim 6 wherein the phosphorus sulfide reactant is $PSCl_3$.

11. A compound of the formula

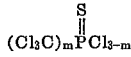

wherein $m$ is a positive integer of at least 1 and not more than 2.

12. A compound of the formula

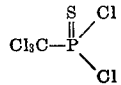

References Cited in the file of this patent

UNITED STATES PATENTS

| 2,672,459 | Kuh | Mar. 16, 1954 |
| 2,724,725 | Craig et al. | Nov. 22, 1955 |

OTHER REFERENCES

Walsh et al.: J.A.C.S., vol. 77, page 931 (1955).

UNITED STATES PATENT OFFICE
CERTIFICATE OF CORRECTION

Patent No. 2,993,929

July 25, 1961

Kenneth H. Rattenbury

It is hereby certified that error appears in the above numbered patent requiring correction and that the said Letters Patent should read as corrected below.

Column 5, lines 38 to 41, the formula should appear as shown below instead of as in the patent:

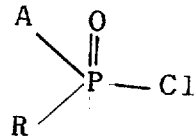

Signed and sealed this 9th day of January 1962.

(SEAL)
Attest:

ERNEST W. SWIDER
Attesting Officer

DAVID L. LADD
Commissioner of Patents